July 31, 1962 W. R. JOHNSTON 3,047,842

MAGNETIC-CORE SHIFT REGISTER

Filed May 16, 1960

WILLIAM R. JOHNSTON
INVENTOR.

BY Lyon & Lyon
ATTORNEYS

United States Patent Office 3,047,842
Patented July 31, 1962

3,047,842

MAGNETIC-CORE SHIFT REGISTER

William R. Johnston, Los Angeles, Calif., assignor, by mesne assignments, to Ampex Corporation, Redwood City, Calif., a corporation of California Filed May 16, 1960, Ser. No. 29,293
4 Claims. (Cl. 340—174)

This invention relates to magnetic-core shift registers and, more particularly, to improvements therein.

Magnetic-core shift registers are widely employed as a temporary storage, buffering, or delay device in data-handling apparatus. The magnetic-core elements used in the shift register may be either of the simple toroidal-ring type, or of the type having a plurality of small apertures in the ring of the toroid and known as multiaperture cores. The magnetic cores are customarily of the type having substantially rectangular hysteresis characteristics and with two stable states of magnetic remanence. Data is represented by the cores being in one or the other of these two states of remanence. In a shift register, the data is transferred through the register by actually transferring the states of remanence of the cores. A number of different circuits are employed for transferring these remanence states.

Early in this art the circuits for transferring the remanence states of magnetic cores included a plurality of diodes and resistors. Thereafter, diodes and capacitors were employed. When multiaperture cores are used, the transfer circuit may include just the coupling wires, and nothing else. However, multiaperture cores are expensive and are not simple to manufacture. The other shift-register devices employ a plurality of components, and thus are rather expensive. Further, the more circuit components employed in the transfer circuit, the slower the operation of the system.

It is an object of this invention to provide a magnetic-core shift register which is simpler to construct than those made heretofore.

Another object of this invention is to provide a novel circuit for transferring the state of remanence from one core to a succeeding core.

Yet another object of this invention is to provide a magnetic-core shift register which is less expensive than those known heretofore.

Yet another object of the present invention is to provide a magnetic-core shift register which is capable of high-speed operation.

These and other objects of the invention may be achieved by providing between adjacent cores of a shift register a first winding on the preceding core and a second winding on the succeeding core. A first and second terminal are provided also, and the first winding is connected to the first and second terminals. One of the ends of the second winding is connected to the second terminal, and a rectifier is connected between the other end of the second winding and the first terminal. A potential is applied to the first and second terminals in a manner to cause current to flow from the first to the second terminal. The amplitude selected for this potential is such that the current that will flow is sufficient to drive a magnetic core from one state of remanence to the other. If the preceding core is in its clear state, the succeeding core remains unaffected in its clear state. If the preceding core is in its set state, it is driven to its clear state, and, in changing, steers current through the second winding sufficient to drive the succeeding core to its set state.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figures 1, 2:
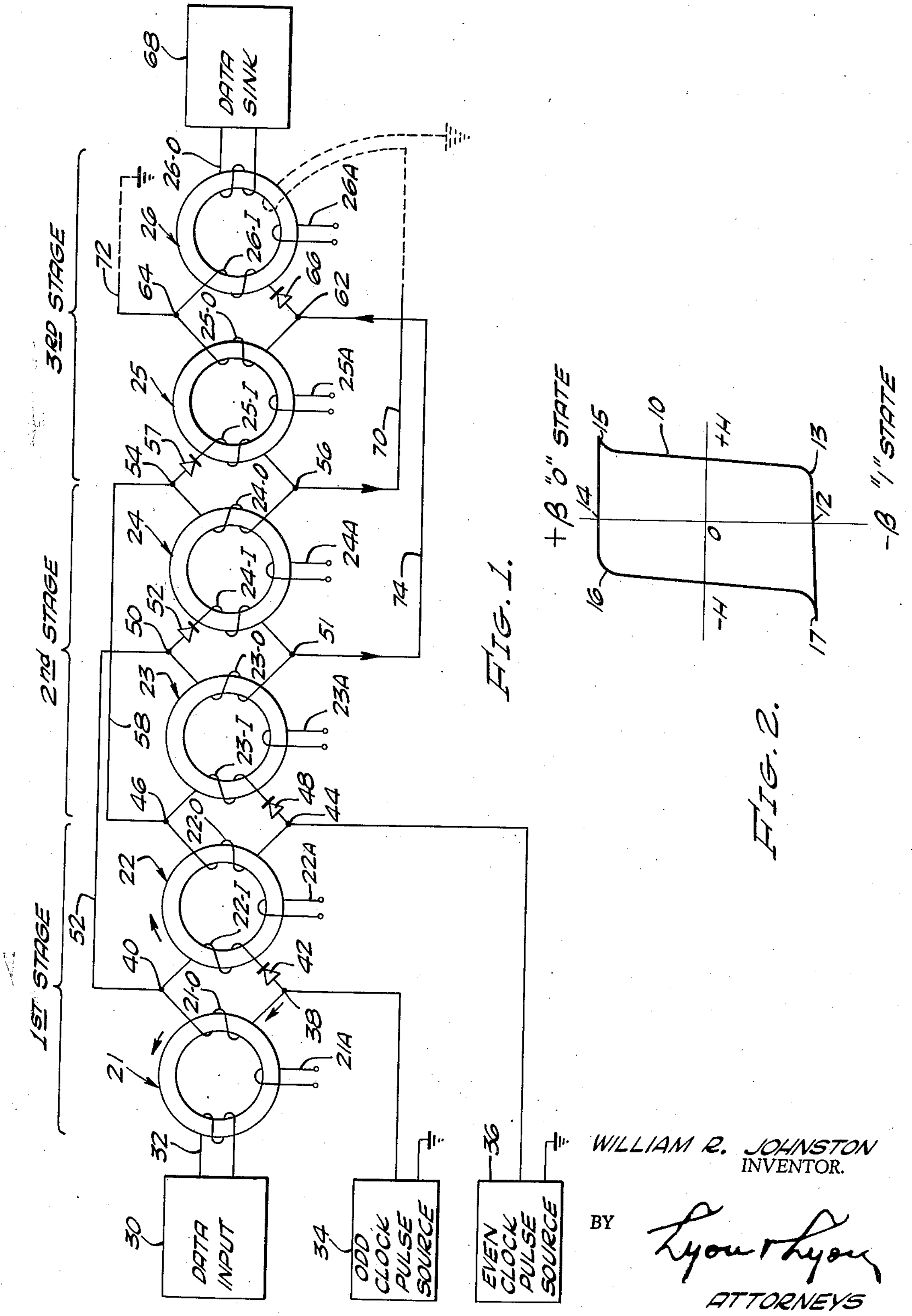
FIGURE 1 is a circuit diagram of an embodiment of the invention.
FIGURE 2 represents a typical hysteresis characteristic for a magnetic core of the type preferably employed with the embodiment of the invention.

Referring now to FIGURE 1 of the drawings, there may be seen an embodiment of the invention. It employs a plurality of magnetic cores. Those shown have a toroidal shape which is preferable, although not necessary. Each of these cores has a hysteresis characteristic of the type illustrated in FIGURE 2 and represented by the wave shape 10 shown there. Each core will have two states of substantially stable magnetic remanence 12, 14. When a core is at the state of remanence 12, it will be assumed that it is in its clear state, at which it represents a zero binary bit. When a magnetic core is in the state of remanence 14, it will be assumed that it is in its set state, at which it represents a binary one. To drive a magnetic core in its clear state to its set state, it is necessary to apply sufficient magnetomotive force thereto to cause it to take the path from 12 to 13 to 15. When the magnetomotive force is released, the core will settle to the state of remanence 14. To drive the magnetic core from the set state to the clear state, it is necessary to apply a magnetomotive force in the opposite direction to cause the core to follow the path from 14 to 16 and 16 to 17. Upon the release of the driving force, the core will then return to the state of remanence at 12.

Assume, now, as shown in FIGURE 1, by way of illustration and not to be construed as a limitation upon the size of a shift register made in accordance with this invention, that there are provided three shift-register stages, each including two magnetic cores. The first stage includes the odd core 21 and the even core 22; the second stage includes the odd core 23 and the even core 24; and the third stage includes the odd core 25 and the even core 26. It will become apparent from the description of the invention that a shift register having as many stages as are desired may be built without departing from the spirit of this invention.

Information which is handled by the shift register is obtained from a source represented by the rectangle and labeled "data input 30." The data input 30 is coupled by an input winding 32 to the core 21. The data which is entered comprises binary ones or zeros, which, as previously indicated, may be represented or stored in the core by setting it to its clear or set state. For driving the shift register, there is provided an odd clock-pulse source 34 and an even clock-pulse source 36. These two current pulse generators are actuated in an alternating fashion. The entry of data into the odd core 21 in the first stage in the shift register is made during the time that the even clock-pulse source generator is operated. The shift register does not require a clear winding, since, in the course of the operation which will be described in detail below, the transfer of the state of remanence from a preceding to a succeeding core results in the preceding core being driven to its clear state.

The core 21 has a winding 21–O thereon, which can be designated as an output winding. The ends of this winding are connected to two terminals 38, 40. The core 22 has an input winding 22–I, inductively coupled thereon. The winding 22–I has fewer turns than the winding 21–O and is coupled to the core 22 with an opposite sense than the winding 21–O is coupled to the core 21. As will become clear, the reason for this coupling with opposite sense is that it is desired that current passing through these two windings in the same direction should tend to drive the core 21 to its clear state and the core 22 to its set state of remanence. This will result in the state of remanence of the core 21 being transferred to the core 22 for reasons which will be set forth subsequently herein. The winding 22–I has one end connected to the terminal 40. The other end of the winding 22–I is connected through a rectifier 42 to the terminal 38.

The coupling between the remaining cores in the shift register is substantially identical with a coupling described between the cores 21 and 22. Thus, the output winding 22–O on core 22 is connected to terminals 44, 46. The input winding 23–I on core 23 is connected to terminal 46 and through a rectifier 48 to terminal 44. The output winding 23–O on core 23 is connected to terminals 50, 51. The input winding 24–I on core 24 is connected to terminal 51 and through a rectifier 52 to terminal 48.

It will be noted that the sense of the coupling of the winding 23–O on core 23 is opposite to the sense of the coupling of windings 22–O and 21–O on cores 22 and 21, respectively. Likewise, the sense of the coupling of the winding 24–I on core 24 appears opposite to the sense of the winding 23–I on core 23 and 22–I on core 22. Actually, however, in view of the fact that the direction of current flow is reversed, which occurs by reason of the connection 52 between the terminal 40 and terminal 50, the sense or polarity of the magnetomotive forces applied from winding 23–O of core 23 and 24–I to core 24 remains the same as the sense or the polarity of the magnetomotive forces applied by the output windings and input windings which are on the preceding cores. Thus, the current flow over connection 52 through terminal 50 and winding 23–O will still tend to drive core 23 to its clear state, and the current flow through winding 24–I will still tend to drive core 24 to its set state.

Core 24 has an output winding 24–O which is connected to terminals 54 and 56. It should be noted that there is a connection 58 between the terminal 46 and terminal 54. Core 25 has an input winding 25–I, which is connected through a rectifier 57 to terminal 54, and is directly connected to terminal 56. An output winding 25–O is coupled to core 25 and is connected to terminals 62 and 64. An input winding 26–I on core 26 is connected to terminal 64 directly and through a rectifier 66 to terminal 62. An output winding 26–O is connected to a data sink 68, which receives the information which is passed through the shift register. There is a connection 74 between the terminal 51 and the terminal 62. There is a connection 72 between the terminal 64 and any succeeding shift-register stages in the manner described for connections 74 and 52. There is a connection 70 between the terminal 56 and any succeeding shift-register stages in the manner described for connections 58.

For an explanation of the operation of the shift register, assume first that the magnetic core 21 is driven to its clear state, designated as 14 in FIGURE 2, by an input from the data input 30. It will be remembered that this input should occur when the even clock-pulse source is operated. The next current pulse from the odd clock-pulse source 34 causes current which tends to flow from terminal 38 through the windings 21–O and 22–I. The amplitude of this current should be twice sufficient to drive a core from point 14 to point 15, as illustrated in FIGURE 2. This will generate very little back electromotive force on winding 21–O. The diode, or rectifier, 42, in winding 22–I, as does any diode, requires a difference in potential across its terminals for a current to flow therethrough. In view of the virtually short-circuit parallel current path through winding 21–O, there is not sufficient voltage drop occurring across the diode 42 for current to flow therethrough. Therefore, effectively, all of the current initially emitted by the odd clock-pulse source will pass through the winding 21–O. Thus, core 22 is left unaffected.

Assume, now, that core 21 has been driven to its set state by the data input 30. The core will be driven to its clear state by the current from the odd clock-pulse source flowing through winding 21–O. In the course of such drive, a voltage is induced in the output winding 21–O which is large enough to reduce the flow of current from the odd clock-pulse source, causing a potential buildup across the diode 42 sufficiently large to induce the flow of current through it from terminal 38. Thus, the current from the clockpulse source is steered through the input winding 22–I. This current produces an electromotive force which drives the core 22 to its set state.

When the core 22 goes from its clear to its set state, a voltage is induced in the winding 22–O. It is of such polarity that diode 48 is back-biased and no current will flow as a result of the voltage induced in the winding 22–O. Thus the core 23 will remain unaffected by this current.

Upon the occurrence of an even pulse from the source 36, current will flow through the winding 22–O, which will result in the core 22 being driven from its set to its clear state. This induces a voltage in the winding 22–O, which forward biases diode 48 so that effectively a current-steering operation occurs similar to what occurred in the previous core, and the core 23 is driven to its set state.

Thus, the set state of core 21 has been transferred in two steps to core 23, and core 21 is in the clear state.

Because of the connections 52, 74 and 58, 70, it will be appreciated that in response to an odd clock-pulse of current from the source 34, the simultaneous transfer of the state of remanence occurs from all the odd cores to all the even cores. Also, upon the application of a pulse of current from the even clock-pulse source 36 to the register, a simultaneous transfer occurs from the even core of each register to the odd core of the succeeding register. If desired, each core may provide an output by means of a winding 21A, 22A, 23A, 24A, 25A, 26A on the respective cores 21 through 26. Thereby, the shift register may be operated as an electronic commutator, as well, since the set state of the first core may be propagated through the shift register to provide a commutating pulse output therefrom. The last core in the register may be driven to its clear state to enter its data into the data sink 68. If the core is even, then winding 70 is coupled thereto, as shown by the dotted lines in FIGURE 1, to drive it to its clear state. If the last core is odd, then winding 72 is coupled thereto to drive it to its clear state.

There has been accordingly described and shown herein a novel, useful, and simple shift register which requires less hardware for coupling simple toroidal cores than heretofore thought possible and which is inexpensive to manufacture and simple to operate.

I claim:

1. A shift register comprising a plurality of magnetic cores in a sequence alternate ones of said cores in said sequence being designated as odd cores, remaining ones of said cores in said sequence being designated as even cores, each core in said plurality of cores having two stable states of magnetic remanence and being drivable therebetween, means for transferring the state of magnetic remanence of said odd cores to said even cores comprising, for each odd and even core, a first winding wound with one sense on said odd core, a second winding wound with an opposite sense on said even core, a first and second terminal, means connecting the ends of said first winding to said first and second terminals, means connecting one end of said second winding to said second terminal, a first rectifier connected between the other end of said second winding and said first terminal, and means connecting the second terminal provided for each odd and even core to the first terminal provided for a succeeding odd and even core, means for transferring the state of magnetic remanence of said even cores to said odd cores comprising, for each odd and even core, a third winding wound with one sense on said even core, a fourth winding wound with an opposite sense on said odd core, a third and fourth terminal, means connecting the ends of said third winding to said third and fourth terminals, means connecting one end of said fourth winding to said fourth terminal, a second rectifier connected between the other end of said fourth winding and said third terminal, and means connecting the fourth terminal provided for each even and odd core to the third terminal provided for a succeeding even and odd core.

2. A shift register as recited in claim 1 wherein each said first and third windings have a higher number of coupling turns on said respective even and odd cores than said second and fourth windings on said respective odd and even cores.

3. In a shift register of the type employing a plurality of magnetic cores in a sequence alternate ones of said cores in said sequence being designated as odd cores, remaining cores in said sequence being designated as even cores, each core in said shift register having two stable states of magnetic remanence and being drivable therebetween, and a simultaneous transfer is made of the state of remanence of the odd cores to the even cores and thereafter a simultaneous transfer is made of the state of remanence of the even cores to the odd cores, the improvement in the means for transferring the state of remanence of the odd cores to the even cores and thereafter from the even cores to the odd cores comprising, for each odd and even core, a first winding wound with one sense on said odd core, a second winding wound with an opposite sense on said even core, a first and second terminal, means connecting the ends of said first winding to said first and second terminals, means connecting one end of said second winding to said second terminal, a first rectifier connected between the other end of said second winding and said first terminal, and means connecting the second terminal provided for each odd and even core to the first terminal provided for a succeeding odd and even core, for each odd and even core, a third winding wound with one sense on said even core, a fourth winding wound with an opposite sense on said odd core, a third and fourth terminal, means connecting the ends of said third winding to said third and fourth terminals, means connecting one end of said fourth widing to said fourth terminal, a second rectifier connected between the other end of said fourth winding and said third terminal, and means connecting the fourth terminal provided for each even and odd core to the third terminal provided for a succeeding even and odd core.

4. Apparatus for transferring the state of remanence of one magnetic core to a second magnetic core, both of said magnetic cores having substantially rectangular hysteresis characteristics with two states of stable magnetic remanence, said apparatus comprising a first winding inductively coupled to said one magnetic core with one sense, a second winding having fewer turns than said first winding inductively coupled to said other magnetic core with an opposite sense, a first and second terminal, means connecting the ends of said first winding to said first and second terminals, means connecting one end of said second winding to said second terminal, a rectifier connected between the other end of said second winding and said first terminal, and means to apply a transfer current to said first and second terminals having an amplitude twice that required to drive one of said cores from one to the other of its two states of stable magnetic remanence for transferring the state of magnetic remanence of said first core to said second core.

References Cited in the file of this patent

UNITED STATES PATENTS

| | | |
|---|---|---|
| 2,652,501 | Wilson | Sept. 15, 1953 |
| 2,654,080 | Browne | Sept. 29, 1953 |
| 2,730,695 | Ziffer | Jan. 10, 1956 |
| 2,819,395 | Jones | Jan. 7, 1958 |
| 2,832,951 | Browne | Apr. 29, 1958 |
| 2,844,815 | Winick | July 22, 1958 |
| 2,851,675 | Paivinen | Sept. 9, 1958 |